United States Patent [19]
Langley et al.

[11] Patent Number: 5,169,697
[45] Date of Patent: Dec. 8, 1992

[54] SEAMING TAPE FOR COMPOSITE CHEMICAL BARRIER FABRICS AND METHOD OF FORMING BONDED SEAMS

[75] Inventors: John D. Langley, Guntersville; Edward A. Williams, Albertville, both of Ala.

[73] Assignee: Kappler Safety Group, Guntersville, Ala.

[21] Appl. No.: 528,436

[22] Filed: May 25, 1990

[51] Int. Cl.⁵ .............................................. B32B 3/00
[52] U.S. Cl. ...................................... 428/57; 428/58; 428/60; 428/61; 428/347; 428/349; 428/475.8; 428/476.1; 428/500; 428/515; 428/516; 428/518; 428/520; 156/304.1; 156/304.3
[58] Field of Search ...................... 428/347, 349, 475.8, 428/476.1, 500, 515, 516, 518, 520, 57, 58, 60, 61; 156/304.1, 304.3

[56] References Cited

U.S. PATENT DOCUMENTS

| | | | |
|---|---|---|---|
| 3,415,920 | 12/1968 | Lee et al. | 264/171 |
| 4,563,379 | 1/1986 | Gerhard Kruger | 428/347 |
| 4,833,010 | 5/1988 | Langley | 428/311.1 |

Primary Examiner—Paul J. Thibodeau
Assistant Examiner—Leszek Kiliman
Attorney, Agent, or Firm—Phillips & Beumer

[57] ABSTRACT

Seaming tape made up of a composite multilayer material of specified composition is used to form bonded seams between pieces of composite chemical barrier fabrics. The tape includes a base multilayer material made up of a stacked, laminated array including an outside layer of ethylene vinyl acetate and successive layers of polyvinylidene chloride, ethylene vinyl acetate, and chlorinated polyethylene. Tape of this composition may be bonded to a variety of polymeric materials and provides an effective seam for some applications. A second multilayer film sheet bonded to the base sheet provides a more effective seam for forming a barrier to a wide spectrum of chemicals. The second film sheet includes an interior layer of ethylene vinyl alcohol sandwiched between layers of nylon or polyethylene. To form a bonded seam, the tape is placed over an interface between pieces of fabric and is bonded by application of heat and pressure, with the barrier fabric first being stitched together if desired to provide a more durable seam. The seaming tape and method are particularly useful for seaming of composite multilayer chemical barrier fabrics. A highly effective and durable seam is obtained by use of the invention.

10 Claims, 1 Drawing Sheet

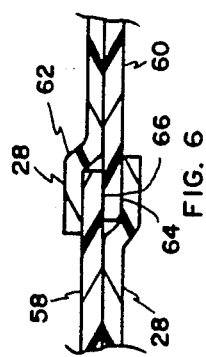
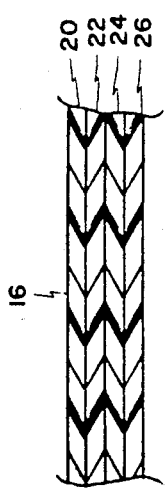
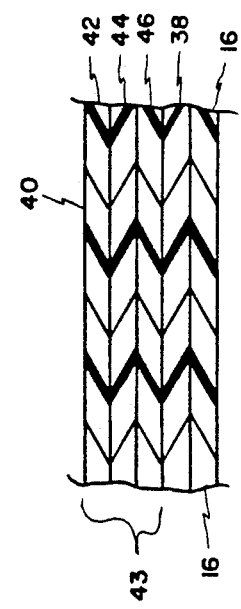
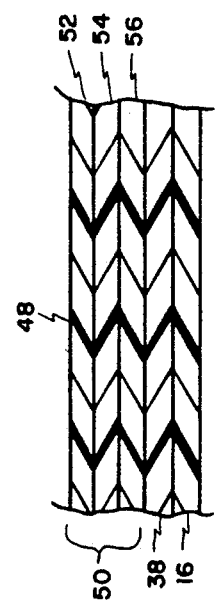
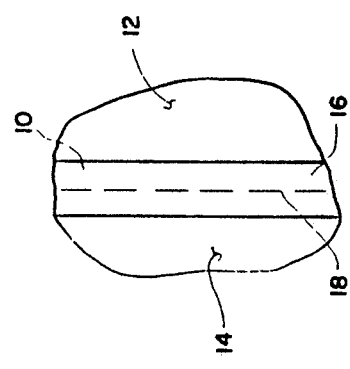
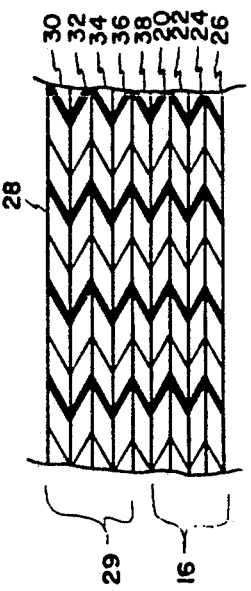

SEAMING TAPE FOR COMPOSITE CHEMICAL BARRIER FABRICS AND METHOD OF FORMING BONDED SEAMS

FIELD OF THE INVENTION

This invention relates generally to composite chemical barrier fabrics and more particularly to seaming tapes and methods for forming bonded seams between pieces of such fabric.

BACKGROUND OF THE INVENTION

Composite multilayer fabrics that form a barrier to passage of toxic chemicals have been developed for use in protective garments. Garments made of effective barrier materials provide safer working conditions by preventing hazardous materials from coming into contact with the worker's body. The need for protective garments has been emphasized in recent years by enactment of local, state, and federal laws and promulgation of regulations requiring their use under many circumstances.

A highly effective composite multilayer barrier fabric is disclosed in my prior U.S. Pat. No. 4,833,010, issued May 23, 1989. This fabric has a base sheet of a material such as nonwoven polypropylene that has internal void spaces, a sheet of a first multilayer film material laminated to one face of the base sheet, and a sheet of a second multilayer film laminated to the opposite face of the base sheet. The first multilayer sheet includes an inner film of ethylene vinyl alcohol with a film of nylon laminated to each face thereof and an outer film of heat sealable polyethylene. The second multilayer film has a middle film of polyvinylidene chloride with a film of ethylene vinyl acetate laminated to its inner face and a film of heat-sealable polyethylene laminated to its outer face. This composite fabric is highly effective against a wide spectrum of chemicals. In standardized tests using the ASTM F739 test method wherein the fabric is as exposed to the ASTM F1001 chemical test battery, which includes 15 chemicals representing numerous classes of compounds, no breakthrough for any of the chemicals in the test battery occurred during an eight-hour test period.

A problem which has been presented in preparing protective garments from the composite fabric described above is the difficulty encountered in forming leak-proof durable seams between pieces of the fabric. In order to provide an effective protective garment, the seams therein as well as the fabric must provide a barrier to passage of liquid or gaseous chemicals sought to be excluded. Conventional sealing tapes made up of material such as polyethylene are not fully effective when bonded to this fabric in that they fail to provide a desired barrier for many of the chemicals in the referenced test battery. In addition to forming an effective barrier, sealing tape for fabrication of garments should be readily heat-sealable and should be amenable to forming a strong and durable seam when applied to the fabric. Requirements also exist for seaming of other types of composite fabrics and for joining of such fabrics to components such as clear plastic visors and zippers in fabrication of protective garments.

SUMMARY OF THE INVENTION

This invention is directed to heat-bondable tapes for making seams between pieces of chemical barrier composite fabrics and between such fabrics and other components of protective garments and to a method of forming such seams. The seaming tapes include a first, base multilayer sheet that is usable by itself for certain less-demanding applications and a second multilayer sheet that, when laminated to and combined with the base sheet, provides an effective barrier to a wide spectrum of chemicals, giving a durable seam with the same barrier ability as is provided by the barrier fabric disclosed in my prior patent, referenced above. A sheet of polyethylene may also be disposed between the multilayered sheets to provide enhanced adhesion in forming the component sheets into a single tape.

The base multilayer sheet is made up of a stacked, laminated array of successive layers of polymeric film including an outside layer of ethylene vinyl acetate, which layer in use is disposed in contact with the fabric being seamed, a layer of polyvinylidene chloride, a second layer of ethylene vinyl acetate, and an outside layer of chlorinated polyethylene.

The second multilayer sheet, which is included in the preferred combination, includes an interior layer of ethylene vinyl alcohol sandwiched between layers of nylon or polyethylene.

Preparation of a seam between pieces of the barrier fabric may be carried out by placing the seaming tape over the fabric along the seam line with the ethylene vinyl acetate outside layer of the base tape in contact with the fabric and applying heat and pressure to obtain bonding with the fabric substrate. To obtain stronger and more durable seams, the fabric region may be stitched together, with the seaming tape covering the stitching to avoid leakage through needle holes. In addition, the seaming tape may be appplied to both sides of the fabric as well as to one side only to provide a greater barrier effect.

Seaming tapes and methods embodying the invention provide highly effective seams for protective garments, with the resulting seams showing the same barrier properties as the fabric itself, although a lesser degree of effectiveness suitable for some applications may be obtained by using only a single multilayer tape as described herein. The tapes may also be used for bonding of barrier fabric to components of protective garments such as plastic visors, zippers, and the like.

It is, therefore, an object of this invention to provide seaming tapes that, when bonded to adjacent pieces of chemical barrier fabric, produce a seam with effective barrier properties.

Another object is to provide protective garment seams that have high strength and durability.

Yet another object is to provide a method of forming such seams.

Other objects and advantages of the invention will be apparent from the following detailed description.

BRIEF DESCRIPTION OF THE DRAWINGS

FIG. 1 is a top plan view showing a bonded seam embodying the invention.

FIG. 2 is an enlarged cross-sectional view showing a multilayer sheet used as the base sheet in seaming tapes embodying the invention.

FIG. 3 is an enlarged cross-sectional view showing the sheet of FIG. 2 bonded to an additional multilayer sheet.

FIG. 4 is an enlarged cross-sectional view showing the base sheet of FIG. 2 bonded to a different, additional multilayer sheet.

FIG. 5 is an enlarged cross-sectional view showing the base tape of FIG. 2 bonded to yet another different additional multilayer sheet.

FIG. 6 is a cross-sectional view showing seaming tapes embodying the invention forming a bonded joint between components of a protective garment.

DESCRIPTION OF THE PREFERRED EMBODIMENT

Referring to FIG. 1 of the drawings, a bonded seam 10 between pieces 12 and 14 of chemical barrier fabric is shown. The seam is formed by a multilayer tape 16 embodying the invention disposed so as to cover the interface 18 between the fabric pieces and bonded to the top surface thereof.

FIG. 2 shows the structure of a multilayer tape which may be used alone or in combination with a layer of polyethylene for certain less-demanding applications or, when combined with an additional multilayer tape, for providing a more complete barrier at garment seams. The tape 16 of FIG. 2 includes an upper layer 20 of chlorinated polyethylene and successive layers of ethylene vinyl acetate 22, polyvinylidene chloride 24, and ethylene vinyl acetate 26. When used in combination with a layer of polyethylene, that layer is preferably disposed on the chlorinated polyethylene side of this multilayer tape. In forming a seam, the bottom layer 26 of the tape is disposed next to the barrier fabric and over the interface between the pieces to be seamed. Multilayer composite sheet material having this structure is available from Dow Chemical Company under the designation XU 65505.06 or 65505.07. This material has been used previously for specialized medical applications but is not known to have been used as a seaming tape or bonding material for joining chemical barrier fabrics.

FIG. 3 shows a preferred seaming tape 28 made up of two laminated multilayer sheet materials bonded together to provide a tape structure having a highly effective chemical barrier capability. Tape 28 includes a bottom multilayer base sheet made up of layers 20-26 having the composition given above with respect to FIG. 2. The base sheet is bonded to a second multilayer sheet 29 with a layer of polyethylene 38 being disposed between the two multilayer sheets. Upper sheet 29 includes an outer layer 30 of linear low-density polyethylene, a first layer 32 of nylon adjacent to the outer layer, a layer 34 of ethylene vinyl alcohol next to the first nylon layer, and a second nylon layer 36 adjacent to layer 34. A layer of polyethylene 38 disposed between the two multilayer sheets enhances bonding of the two multilayer sheets to one another. In addition, pigments may be readily incorporated into the polyethylene layer to provide a color as may be desired for identification purposes. A film sheet material having the structure shown for tape component 29 is available from Print Pack, Inc., under the designation Omniflex ™, C44-442.

FIG. 4 shows a multilayer seaming tape 40 made up of base sheet 16 of the composition given above and a multilayer sheet 43 with a layer of polyethylene 38 being disposed between the two multilayer tapes. Sheet 43 has an upper layer 42 of linear low-density polyethylene, a middle layer 44 of ethylene vinyl alcohol and a lower layer 46 of linear low-density polyethylene. Sheet material having this structure is available from Print Pack, Inc., under the designation Omniflex ™, No. C44-542.

In FIG. 5 there is shown a multilayer seaming tape 48 made up of a multilayer composite sheet 50 disposed over base sheet 16 with an intervening layer of polyethylene 38. Sheet 50 has an upper layer 52 of low-density polyethylene, a middle layer 54 of ethylene vinyl alcohol, and a lower layer 56 of low-density polyethylene. Sheet material having this structure is available from Print Pack, Inc., under the designation Omniflex ™, No. C44-449.

FIG. 6 shows a bonded joint between a fabric 58 made up of polyethylene and a visor 60 of transparent polyvinyl chloride sheet material. A tape 28 of the composition shown in FIG. 3 is disposed over an overlapped region 66 between the parts being joined to provide an upper seaming tape 62 and a lower one 64.

Multilayer composites of seaming tapes having the structures described above may be prepared by extruding a layer of adhesive such as polyethylene between the base sheet and an additional multilayer sheet, immediately cooling the resulting composite material with a chill roller, and cutting the material in strips of convenient widths such as ⅜ to 1.0 inch.

Bonded seams between adjacent pieces of chemical fabrics may be formed by placing the pieces in generally edge-to-edge relation disposing a seaming tape so as to cover the edges on at least one side and applying heat and pressure by means of a conventional heated-air welding machine. To provide a more durable seam, it is preferred first to stitch the fabric edges together with the edge regions being placed like side to like side and then to place so as to cover all stitching holes. For maximum durability and barrier effects, seaming tape may be placed on both sides of the fabric.

The invention is further illustrated by the following specific examples.

EXAMPLE 1

Samples of multilayer barrier fabric of the composition given in my above-referenced prior U.S. Pat. No. 4,833,010, were seamed by placing a tape as shown and described with reference to FIG. 3, above, over adjacent edges of the barrier fabric and bonding the tape to fabric regions adjacent the interface between fabric pieces on one side only. The seamed fabrics were then subjected to permeation testing using the ASTM F739 method, the seamed fabric being exposed to the 15 chemicals listed in the ASTM F1001 chemical test battery and to two gases, ammonia and chlorine, as specified by the National Fire Prevention Association for testing. Test runs were conducted in each of three cells for each of the chemicals. In all cases, the minimum detection level was one part per million or less. Tests were conducted at ambient temperature and for a duration of three hours in all cases. The results obtained are given in the following table.

PERMEATION TEST RESULTS
(tape seam on one side of fabric)

| | Breakthrough Time (minutes) | | | Permeation Rate ($\mu g/cm^2$-hr) | | | Minimum Detection (ppm) |
|---|---|---|---|---|---|---|---|
| | Cell 1 | Cell 2 | Cell 3 | Cell 1 | Cell 2 | Cell 3 | |
| Acetone | 4 | 8 | 4 | .84 | .59 | 1.3 | 0.001 |
| Acetonitrile | None | None | None | N/A | N/A | N/A | 1.0 |
| Ammonia (gas) | 8 | 4 | 16 | 10.2 | 41.0 | 3.9 | 0.001 |
| Carbon Disulfide | 4 | 4 | 4 | .48 | .74 | 1.6 | 0.002 |
| Chlorine (gas) | None | None | None | N/A | N/A | N/A | 1.0 |
| Dichloromethane | 4 | 8 | 12 | 3.5 | .78 | .66 | 0.016 |
| Diethylamine | None | None | None | N/A | N/A | N/A | 0.018 |
| Dimethylformamide | None | None | None | N/A | N/A | N/A | 0.011 |
| Ethyl Acetate | 8 | 8 | 20 | .26 | .77 | .04 | 0.002 |
| Hexane | 8 | 8 | 8 | 3.0 | 4.9 | 3.6 | 0.030 |
| Methanol | 4 | 28 | 4 | 9.0 | 4.5 | 21 | 0.012 |
| Nitrobenzene | None | None | None | N/A | N/A | N/A | 0.025 |
| Sodium Hydroxide (50% w/w) | None | None | None | N/A | N/A | N/A | 1.0 |
| Sulfuric Acid (conc.) | None | None | None | N/A | N/A | N/A | 1.0 |
| Tetrachloroethylene | 40 | 40 | None | .16 | .24 | N/A | 0.001 |
| Tetrahydrofuran | 12 | 12 | 36 | .42 | .98 | .42 | 0.033 |
| Toluene | 28 | 32 | 28 | .53 | .36 | .31 | 0.004 |

It may be seen from the foregoing table that complete prevention of permeation was obtained in some cases, while in other cases permeation occurred at varying rates.

EXAMPLE 2

The above series of tests was carried out for a seamed garment as described in Example 1 except that the seaming tape was bonded to the barrier fabric across the interface between fabric pieces on both sides of the fabric. No permeation was observed for any of the listed chemicals; thus, a highly effective barrier is obtained at the seams.

The above examples are merely illustrative and are not to be understood as limiting the scope of the invention, which is limited only as indicated by the appended claims.

We claim:
1. A chemical barrier fabric assembly comprising:
   edge regions of one or more pieces of a chemical barrier fabric placed in adjacent relation and defining an interface therebetween;
   said chemical barrier fabric comprising a base sheet of fabric having internal open spaces, a first multilayer film sheet laminated to one face thereof and a second multilayer sheet laminated to the opposite face of the base sheet, said first multilayer sheet comprising a film of polyethylene vinyl alcohol, a film of nylon laminated to each face thereof, and an outer film or linear low-density polyethylene; and
   said second multilayer sheet comprising a film of polyvinylidine chloride having a film of ethylene vinyl acetate laminated to the inner face thereof and a film of low-density polyethylene laminated to its opposite face;
   a seaming tape covering said interface and bonded to said edge regions, said seaming tape comprising a first multilayer sheet including an outer layer of ethylene vinyl acetate and successive layers of polyvinylidene chloride, ethylene vinyl acetate and chlorinated polyethylene, a layer of polyethylene bonded to said layer of chlorinated polyethylene, and a second multilayer sheet bonded to said layer of polyethylene and including an interior layer of polyethylene vinyl alcohol sandwiched between layers of nylon.

2. A seaming tape fabric for making bonded seams between pieces of composite chemical barrier fabrics comprising:
   a base multilayer film sheet including an outside layer of ethylene vinyl acetate and successive layers of polyvinylidene chloride, ethylene vinyl acetate, and chlorinated polyethylene;
   a layer of polyethylene bonded to said layer of chlorinated polyethylene; and
   a second multilayer film sheet bonded to said layer of polyethylene;
   said second sheet including an interior layer of polyethylene vinyl alcohol sandwiched between layers of nylon, linear low density polyethylene or low-density polyethylene.

3. A seaming tape fabric as defined in claim 2 wherein said second multilayer film sheet comprises a first outer layer of linear low-density polyethylene, successive inner layers of nylon and polyethylene vinyl alcohol, and an outer layer of nylon, said outer layer of nylon being bonded to said layer of polyethylene.

4. A seaming tape as defined in claim 2 wherein said second multilayer film sheet comprises a first outer layer of linear low-density polyethylene and successive layers of polyethylene vinyl alcohol and a second outer layer of linear low-density polyethylene, said second outer layer of linear low-density polyethylene being bonded to said layer of polyethylene.

5. A seaming tape fabric as defined in claim 2 wherein said second multilayer film sheet comprises a first outer layer of low-density polyethylene and successive layers of polyethylene vinyl alcohol and a second outer layer of low-density polyethylene, said second outer layer of low-density polyethylene being bonded to said layer of polyethylene.

6. The seaming tape fabric as defined in claim 2 including a pigment disposed in said layer of polyethylene.

7. The seaming tape fabric as defined in claim 3 including a pigment disposed in said layer of polyethylene.

8. The method of forming bonded seams between pieces of chemical barrier fabric which comprises placing said pieces in generally edge-to-edge relation so as to define a joint interface region, disposing a tape over said region in contact with said pieces, said tape comprising a multilayer film sheet including a first outer layer of linear low density polyethylene and successive layers of nylon, polyethylene vinyl alcohol, nylon, polyethylene, chlorinated polyethylene, ethylene vinyl acetate, polyvinylidene chloride, and a second outer layer of ethylene vinyl acetate, said second outer layer of ethylene vinyl acetate being disposed in contact with said pieces and applying heat and pressure whereby a bonded seam of said pieces with said tape is formed.

9. The method of claim 8 including stitching said pieces of fabric along said interface region prior to disposing said tape over said region.

10. The method as defined in claim 8 wherein a said tape is disposed over said joint interface region on both faces of said fabric.

* * * * *